United States Patent [19]

Parker et al.

[11] Patent Number: 4,692,235
[45] Date of Patent: Sep. 8, 1987

[54] SELECTIVE PLACEMENT OF FLUID INJECTION IN A RISER REACTOR EQUIPPED WITH A HORIZONTAL TEE JOINT CONNECTION TO SUBSTANTIALLY REDUCE BACK PRESSURE IN THE RISER REACTOR

[75] Inventors: Wesley A. Parker, Houston; Donald E. Hardesty, Brookshire; Jack E. Stanley, Katy, all of Tex.

[73] Assignee: Shell Oil Company, Houston, Tex.

[21] Appl. No.: 867,663

[22] Filed: May 28, 1986

[51] Int. Cl.⁴ .................................................. B01J 8/18
[52] U.S. Cl. .................................... 208/113; 208/153; 422/140; 422/144; 422/147; 422/214
[58] Field of Search ................ 422/144, 145, 147, 214, 422/140; 208/106, 113, 127, 153

[56] References Cited

U.S. PATENT DOCUMENTS

| | | | |
|---|---|---|---|
| 2,741,546 | 4/1956 | Sweeney et al. | 422/147 |
| 2,874,113 | 2/1959 | Smith et al. | 422/147 |
| 3,353,925 | 11/1967 | Baumann et al. | 422/214 |
| 3,475,326 | 10/1969 | Luckenbach | 422/214 |
| 3,492,221 | 1/1970 | Pfeiffer | 422/144 |
| 3,607,126 | 9/1971 | Pfeiffer | 422/214 |
| 4,414,100 | 11/1983 | Krug et al. | 422/144 |

*Primary Examiner*—Barry S. Richman
*Assistant Examiner*—William R. Johnson
*Attorney, Agent, or Firm*—Kimbley L. Muller

[57] ABSTRACT

An apparatus for reducing the pressure drop in a riser reactor equipped with a horizontal tee joint connection which uses a fluid injection means selectively located at a point juxtaposed to the connection of the horizontal and vertical tubes to prohibit fine particle catalysts from backflow down the elongated riser reactor which omission thereby provides (1) an easy upflow of catalysts and hydrocarbon vapors through the riser reactor and (2) an incentive for the flow of particles up through the elongated riser and transfer laterally to the horizontal tee joint connection.

22 Claims, 1 Drawing Figure

4,692,235

SELECTIVE PLACEMENT OF FLUID INJECTION IN A RISER REACTOR EQUIPPED WITH A HORIZONTAL TEE JOINT CONNECTION TO SUBSTANTIALLY REDUCE BACK PRESSURE IN THE RISER REACTOR

FIELD OF THE INVENTION

This invention concerns an apparatus used in the cracking of hydrocarbons, in the presence of a catalyst, to reduce the molecule size of the hydrocarbons. With the advent of new aluminosilicate catalytic compositions of matter, it has been found desirable to limit the residence time of the catalyst with the hydrocarbon, which is to be cracked, to only a period of time necessary to perform cracking. Usually, this residence time is no more than five seconds and usually less than three seconds. This objective was achieved in part at least by the development of hydrocarbon riser reactor cracking which has been the subject of a plethora of inventions in the recent past. Succinctly, the fine catalytic composition of matter rises very quickly concomitant and cocurrently with passage of a hydrocarbon steam existent in a vapor phase. (The hydrocarbon stream may be charged to the bottom of the riser reactor as a combined gas and liquid stream but usually rises upward through the riser reactor and is cracked in a vaporous phase.)

In order to conduct continuous processing of the hydrocarbon oil, it is necessary to reuse the catalyst. This can be accomplished in a regeneration unit in communication with the riser reactor through various solid/vapor separators and stripping zones.

Separation of the fine catalyst particles and the hydrocarbon product are made in a separation unit, usually referred to as a vertical or horizontal cyclone separator, which openly communicates with the riser reactor. It is necessary to transfer the mixed solid/vaporous phase from the upper portion of the riser reactor to the separation unit. Many attempts have been made to implement separation of the solid particles from the vaporous particles at egress from the riser reactor. Most of these type units utilize a cover shield or shroud over the top of the riser reactor having a contacting place which allows the vapors to rise and pass through slits in the top of the shroud coextensive with separation of the fine catalyst particles through slits in the bottom of the shroud, which then pass to a disengagement zone surrounding or beneath the riser reactor. Such shroud separation systems, which separate at least in part the vapor and solid via the force of gravity, are not the concern of the instant invention.

A number of riser reactors transfer a combined solid particle catalyst phase and vapor phase in a right angle curve path or a substantially right angle curve path to a horizontal cross member in open communication with a cyclone separator. In order to avoid the attrition via impact of the catalyst particles on the top of the riser reactor tube, the same is usually equipped with a cap located at a calculated distance above the intersection of the horizontal connecting conduit and the riser reactor. This cap is usually only an extension of the riser reactor pipe but can entail either a larger bonnet or an askewed surmounted void space. This invention concerns a configuration with either the extension of the riser pipe, the bonnet or the askewed cap leaving a finite area of the riser reactor pipe between the top of the riser reactor pipe and the horizontal connecting tee joint.

One problem continually confronting the passage of catalysts and vapor in a conjunct passage upward through a riser reactor cracking tube is pressure drop. As the pressure drop mounts or rises in the riser reactor it becomes more difficult to provide a smooth consistent flow of catalyst and vapors up through the riser reactor tube. This invention seeks to mitigate problems of pressure drop in the riser reactor by the selective placement of fluid injection means, such as spray or gas injection nozzles, which inject fluid in a direction relatively perpendicular to the vertical axis of the riser reactor and on a horizontal axis relatively the same as, or parallel to, the horizontal axis of the horizontal connecting tee joint conduit.

BACKGROUND OF THE INVENTION

This invention concerns an improvement in an apparatus which contains a horizontal tee joint connection in a riser reactor. This tee joint connection defines a portion of the riser reactor both below and above the tee joint. The latter is open for the intended passage of catalyst and hydrocarbon vapors egressing in an upward manner through the riser reactor. It would seem that the space of the riser reactor above the tee joint is of little use. However, the same is necessary in order to reduce the attrition wear resultant from the impact of the catalyst particles on the top of the riser reactor.

In 1985, U.S. Pat. No. 4,495,063 issued to Walters et al for a riser reactor cap for the conversion of carbometallic oils. The riser reactor contains an interconnecting horizontal passageway for the intended passage of catalyst from the riser reactor to the horizontal passageway. There does not appear to be any concern of pressure drop in the riser reactor, nor any apparatus to mitigate same. In fact, the invention is actually directed to a vented cap ballistics separation device used to achieve rapid separation of the suspension of fluidized solid particulate catalyst and vapors without causing undue wear in the top of the catalyst chamber.

OBJECTS AND EMBODIMENTS

An object of this invention is to provide a selectively situated fluid injection means which can be retrofitted into existing tee joint connection riser reactors at a selective location to charge fluid to the riser reactor and to thereby reduce back pressure against the upward flow of catalyst and vapor through the riser reactor.

Another object of this invention is to provide a select situs for positioning a fluid injection means opposing a horizontal tee joint connection of a riser reactor to inject fluid across the riser reactor and thereby provide a vehicle to accelerate transfer of the catalyst to the horizontal connecting conduit and to also eliminate the backflow of catalyst down the side of the riser reactor.

Another object of this invention is to provide a smooth and uniform passage of catalyst and vapors, in an upward manner, through a riser reactor and into a tee joint connection with a minimum pressure drop throughout the riser reactor by the injection of a fluid at a selective location in the riser reactor.

Another object of this invention is to reduce problems of refluxing, recirculation and catalyst and vapor hold up at and above the riser reactor tee or elbow joint by the injection of a fluid at a selective location via a fluid injection means selectively situated within the riser reactor.

Another object of this invention is to reduce top end effects to eliminate undesirable broadening of the residence time distribution and possible overcracking by this fluid injection.

In one aspect, an embodiment of this invention resides in an apparatus for passing combined phases of an admixture of a vapor phase and fine solid particles upward through a vertical elongated passageway and forcing said combined phases to a second passageway positioned at a substantial right angle with respect to said vertical elongated passgeway which apparatus comprises: a vertical elongated passageway having a vertical axis situated in a substantially vertical upright position having two side walls, an imperforate top, and a bottom portion, wherein said bottom portion of said elongated passageway is possessed with inlet means to permit entry of said phases into said vertical upright elongated passageway; a relatively horizontal elongated passageway situated substantially perpendicular to said vertical elongated passageway and interconnecting and communicating openly with the first of said two side walls of said vertical elongated passageway at the upper portion of said vertical elongated passageway to form a tee joint interconnection wherein a portion of said vertical elongated passageway is situated below said horizontal passageway and a portion of said vertical elongated passageway is situated above said horizontal passageway, wherein said above portion terminates at said imperforate top, and wherein said relatively horizontal elongated passageway communicates with, at the other extreme, a solid particle-vaporous phase separation means; and a fluid inlet injection means selectively located juxtaposed or attached to said second side wall and situated to inject fluid, either a vapor or a liquid, in a direction substantially perpendicular to said vertical axis of said vertical elongated passageway and to project said fluid into said relatively horizontal elongated passageway, wherein said fluid injection acts to aid the passage of said fine solid particles transferred from said vertical elongated passageway to said relatively horizontal elongated passageway and acts to prevent the backflow of said fine solid particles from said portion of said vertical elongated passageway defined as above said relatively horizontal elongated passageway to said position of said vertical elongated passageway defined as below said horizontal passageway.

Another embodiment of this invention comprises an apparatus for passing a hydrocarbon/fine particle size catalyst stream through a riser reactor having a reduced pressure drop, which apparatus comprises a riser reactor elongated tube having a horizontal cross section, an upper portion and a lower portion having hydrocarbon and fine particle size catalyst entry means in the lower portion of said riser reactor; a horizontal hydrocarbon and fine particle size catalyst tee joint discharge tube interconnecting with said riser reactor elongated tube at an angle of about 90° with respect to said riser reactor elongated tube and in open communication therewith at an upper portion of said riser reactor; and at least one fluid injection means for injecting a vapor across said reactor elongated tube in a plane substantially parallel with said horizontal cross section of said riser reactor elongated tube and into said tee joint discharge tube, wherein said vapor injection means comprises at least one gas injection nozzle capable of emitting said vapor in a desired predetermined velocity of 40 ft/sec to 600 ft/sec.

Another embodiment of this invention resides in a method for reducing pressure drop in riser reactor having an upflow of catalyst and hydrocarbon vapors and being in open communication with a relatively horizontal tee joint connection passageway which comprises passing said catalyst and hydrocarbon vapors up through said riser reactor at a temperature of about 1000° F. to about 1500° F. and a pressure of about 1 atmosphere to about 100 atmospheres to crack said hydrocarbons to smaller hydrocarbon molecules, passing said catalyst and said hydrocarbon vapors from said riser reactor to said tee joint connection passageway at an angle substantially perpendicular to said riser reactor wherein fluid is injected through a fluid injection means, to said riser reactor, in a substantially perpendicular injection flow path with respect to the vertical axis of said riser reactor and in a flow path substantially parallel with respect to the horizontal axis of said tee joint connection passageway.

BRIEF DESCRIPTION OF INVENTION

This invention concerns a fluid injection means to be selectively situated in a riser reactor equipped with a horizontal tee-joint connection to reduce back pressure in the riser reactor from a distance above the initial bottom of the riser reactor to a point as high as the upper portion of the tee joint connection.

DETAILED DESCRIPTION OF INVENTION

Pressure drop in a riser reactor is significantly reduced by the selective injection of fluid (either as a vapor or a liquid) in the riser reactor from a selectively situated fluid injection means. In a riser reactor, hydrocarbonaceous gas or vapor material is passed upward in the presence of fine particulate catalysts to achieve the catalytic cracking of the hydrocarbons in a gaseous phase to hydrocarbons having smaller molecules. With the advent of new aluminosilicate zeolite catalysts, the residence time in the riser reactor is a critical factor to consider in the cracking procedure. It is desired that the catalyst be in contact with the gas or vapor material for only a period of time necessary to perform the cracking. Any extension of this time results in undue coking of the catalyst and possible physical damage to the catalyst surface. For this reason, the residence time in a riser reactor should preferably be between 1 and 5 seconds and most preferably between 2 to 3 seconds.

The catalyst charged to the riser reactor are usually derived from a coextensive and cooperating regeneration system. Suitable catalysts include natural crystalline aluminosilicate zeolites or synthetic crystalline aluminiosilicates, the latter of which is normally employed in FCC cracking schemes. For example, natural occuring crystalline aluminosilicates are exemplified by faujasite, mordenite, clinoptilote, chabazite, analcite, stilbite, leucite, etc. while synthetic crystalline aluminosilicates are exemplified by such silicates as zeolite X, zeolite Y, zeolite L, zeolite Z, zeolite A, etc. Specific examples of how to acquire contemplated zeolites are presented in U.S. Pat. Nos. 2,882,244, 3,008,803, 2,996,358, 3,011,869, 3,012,853, etc.

The feed material to the riser reactor is normally heated to a significantly high enough temperature to make the fee fluid for pumping introduction into the riser reactor. It is preferred that the feed be entered to the riser reactor as a mixed phase feed with a preheat temperature as high as 700° to 800° F. the catalyst derived from the regeneration system is admixed with the feed material, the former having a very high temperature (such as 1000° F.) to act as a heat sink for the hydrocarbon feed material. The vapor velicity in the riser reactor will usually comprise between 25 and 35 feet per second, but may range up to 100 feet per second or higher. This velocity should be calculated to provide contact of the catalytic material with the vapor phase for a period of time only for a duration sufficient to complete the cracking of the larger hydrocarbon molecules to smaller hydrocarbon molecules and to mitigate the buildup of coke on the catalyst material.

The pressure in the riser reactor may range from 10 to 35 psig. The ratio of feed hydrocarbon to catalyst will depend upon the variety of mineral oil (feedstock) to be cracked but will normally be within the range of 3 to about 15.

The riser reactor is described and defined herein as a vertical elongated passageway tube having a vertical axis and a length to diameter ratio of at least 10 and more preferably between 25 and 30. Before the catalyst and vapor phase ascends to the top of the riser reactor, a horizontal tee joint comprising a horizontal elongated tube communicates openly with the riser reactor. The distance from the top of the riser reactor to the tee joint interconnection will vary depending on the diameter and height of the riser reactor. It should be noted, however, that the cap for the riser reactor should be of sufficient height above the tee joint so as to avoid or mitigate catalyst attrition on the top portion of the riser reactor and thereby eliminate metal fatigue. It is also contemplated within the scope of this invention that the cap may be askewed at an angle so as to further eliminate attrition wear. Also, an inverted wedge may be placed at the top of the riser reactor as exemplified in FIG. 3 of aforementioned U.S. Pat. No. 4,495,063.

The intersection of the tee joint with the riser reactor is preferably made at a 90° angle. However, in order to better position the respective horizontal or vertical cyclone separator with respect to the riser reactor, the horizontal connecting tube or passageway may be placed at an angle of less than 90° with respect to the vertical axis of the riser reactor. This will act to eliminate accumulation of solid particulate catalytic material in the horizontal connecting passageway and thereby prevent decomposition of the catalyst and fire hazards. The formed resultant angle can be an acute angle of the horizontal passageway with respect to the vertical axis of the riser reactor of between 89° to 75°. The horizontal passageway may also be equipped with certain flow deflection means to avoid attrition via the high speed catalyst particles impact on the same situs of the horizontal passageway (usually in the top of same juxtaposed to open communication with the riser reactor).

The pressure drop is reduced in the riser reactor as a direct derivative of injecting a fluid at a selective location in the riser reactor. If the resier reactor is described as having (1) a lower portion defined by a distance lower than the tee joint discharge tube and higher than the bottom of the bottommost portion of the riser reactor and (2) an upper portion defined by the riser reactor lower than the imperforate top and higher than the highest portion of the tee joint interconnection, then the selective location for the fluid injection means is intermediate these lower and upper distances. If selective location of the fluid injection means is described relative to the tee joint discharge conduit, then it will be situated at a point in a horizontal axis plane of the tee joint connection, or alternatively in a plane parallel to the horizontal axis of the tee joint connection. The fluid injection means is selectively situated so that fluid egressing therefrom passes in a flow path substantially perpendicular to the vertical axis of the riser reactor tube. Again, the selective height of the fluid injection means relative to the riser reactor length is at a point higher than the interconnection of the lowest member of the horizontal tee joint connection with the riser reactor and lower than the highest point of the horizontal tee joint connection with the riser reactor.

The fluid of this invention can be either a vapor or a liquid with vapor being the preferred species. The means by which vapor is added to the riser reactor is by a fluid injection means inclusive of a gas injection nozzle, lower pressure drop nozzles, i.e. having a pressure of less then 10 lbs./sq. in., contoured aperatures or slits in the side walls or connected to the side walls of the riser, a bank of a multiplicity of small nozzles, perforated plates and the like. The vapor injection means provide vapor at relatively low velocities, i.e. 40 ft/sec to 600 ft/sec, to transmit the momentum from the vapor to the downflowing catalyst. Caution must be exercised in that the vapor velocity not become too high, i.e. less than 600 ft/sec. to cause the vapor to affirmatively penetrate the upflow of catalyst and thereby render the ingress of the vapors as ineffective or even detrimental. The vapor which is added to the riser reactor is preferably steam, an inert gas, recycle gas or combinations of same.

Where the fluid is a liquid, the force which provides incentive for the downflowing catalyst particles to pass to the horizontal tee joint connection is the sudden vaporization of the liquid to a vapor. It is therefore preferred that the liquid be entered to the riser reactor in relatively small droplets, which encourage rapid evaporation. The preferred droplet size is from 100-500 microns with the lower size droplets being the most preferred. The fluid injection means for the liquid will thus differ from the fluid injection means for admission of vapor to the riser reactor. Some type of liquid injection means include atomization nozzles, fog-pattern nozzles, spray nozzles and the like. The pressure drop across the nozzles is preferably between 50 and 100 lbs/sq. with a higher pressure drop being preferred. The quantity of liquid added is dependent only on the capacity of the cyclone separation unit. Types of liquid will comprise recycle liquids, other hydrocarbons, water, recycle water, combined water-hydrocarbon phases, with or without atomization. Although not preferred within the scope of this invention it is feasible that the liquid be added through a non-atomizing nozzle with a low liquid velocity.

The speed at which vapor enters the riser reactor from the fluid injection means is at a velocity of from about 40 ft/sec. to about 600 ft/sec. The preferred velocity of entry of the vapor is about 40 ft/sec. to about 200 ft/sec., although the actual most preferred speed will be dependent upon the pressure drop existent in the riser reactor and the speed of upflow of the catalyst particles. And the latter may be dependent upon the degree of coke which has depleted the activity of the cracking catalyst. The speed of entry of the liquid to the riser reactor is irrelevant to operability with the critical factor of liquid admission being droplet size (100-500 microns) and pressure drop (50 to 100 lbs/sq. in.)

It was surprisingly discovered that the injection of a vapor or liquid inert to the cracking process of a petroleum feedstock greatly reduces the pressure drop existent in a riser reactor having a horizontal tee joint connection. It is hypothesized that the reason for this is that injection of the fluid steam not only gives incentive for the gasiform and catalyst particles to laterally flow from the riser reactor to the tee joint connection but also prevents the backflow of catalyst particles down the side of the riser reactor opposite the horizontal tee joint connection.

Again, high activity aluminum silicate catalyst currently used in FCC processing requires quick disengagement from the cracked hydrocarbon product. This invention provides the advantage of having a smaller disengaging device necessary to accomplish this task. As shown in the instant example, illustrative of this invention, the pressure drop differential reduction across the riser reactor decreases with an increase in the air flow rate.

DETAILED DESCRIPTION OF THE INVENTION

Figure 1:
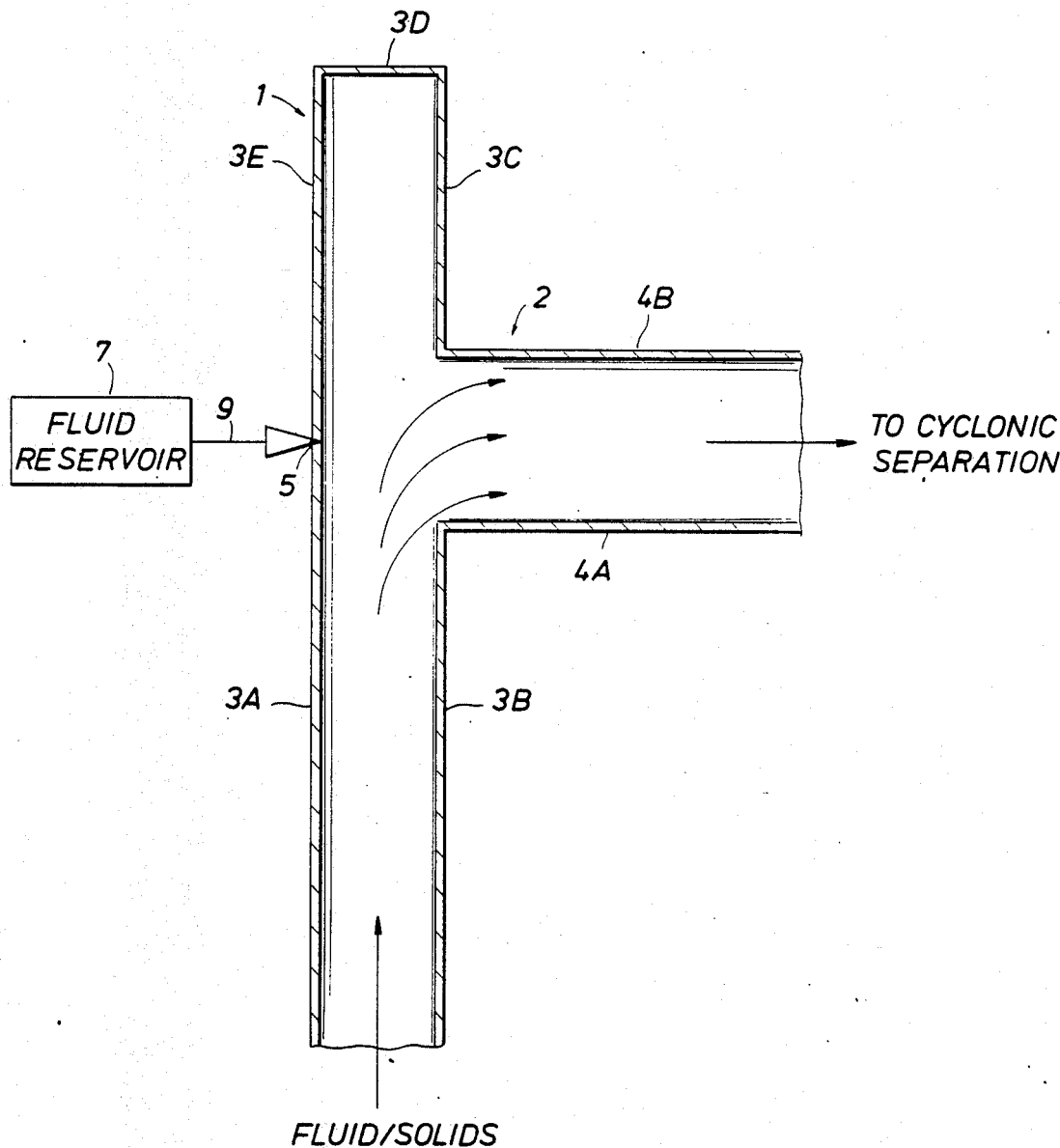
FIG. 1 is a side view of a riser reactor with a relatively horizontal tee joint interconnecting the riser reactor and the fluid injection means selectively situated juxtaposed or attached to the side opposite the relatively horizontal tee joint interconnection.

In FIG. 1 a riser reactor 1 is shown having a relatively open perpendicular communication with a relatively horizontal tee joint discharge conduit 2. Fluid and solid materials pass upwardly through the riser reactor on either side of riser reactor 3A and 3B and pass into open communication with horizontal tee joint horizontal tube 2 having sides 4A and 4B. While it is shown that side 4A and 4B interconnect with side 3B and 3C at a substantially perpendicular relationship, this angle may actually be an acute angle of between 89° and 75° with respect to a vertical axis of riser reactor tube 1. A large portion of the fluid and solid material, in a conventional riser reactor equipped with a horizontal tee joint interconnection, flows into open communication with the horizontal tee joint conduit. A small but important portion will pass upwardly and contact imperforate top 3D and descend as a backflow alongside either conduits 3E or 3C. This backflow along sidewall 3E-3A results in an undue and undesirable pressure drop in the riser reactor thereby preventing upflow of the fluid and solid materials. The solution to this backflow problem, i.e. a reduction in the pressure drop in the riser reactor 1, is placement of fluid injection means 5 which preferably penetrates sidewall 3E-3A or is at least situated juxtaposed thereto. The fluid injection means can be a nozzle, bank of nozzles, valves, fog nozzle, multiple perforations or contoured aperatures with compressed inert fluid (either vapor or liquid) being forced therethrough. The fluidizatin means for admission of a vapor or fluid is preferably a bank of retrofitted gas injection nozzles in intercommunication with fluid access reservoir 7 via supply conduit 9. The fluid injection means for admission of a liquid fluid is preferably at least one fog pattern nozzle which communicates with liquid access reservoir 7 via supply conduit 9. The situs of the fluid injection means will bifurcate one side of the riser reactor into sides 3E and 3A. The situs should be located at a position such that side 3E is preferably not shorter than side 3C and that side 3A is preferably not shorter than side 3B.

ILLUSTRATIVE EMBODIMENT

In this embodiment a clear plastic scaled model of a riser reactor with a horizontal tee joint connection was maintained with a fluid nozzle injection means at a point substantially in an equal or parallel horizontal plane with the interconnection of the horizontal passageway with the vertical upflow passage. The temperature and pressure were essentially room temperature, which is not synonymous with a commercial embodiment, in light of the use of nitrogen as the gaseous phase in replacement of vaporized hydrocarbon. The pressure drop was determined at the end of the riser reactor. Table 1 shows the variance in the riser reactor with a ⅜ inch nozzle, a ¼ inch nozzle and in a comparative riser reactor without the existence of the air injection nozzles. The gas flow rate of the stream being emitted from either of the two nozzles and results derivative of the illustration are also shown in Table 1.

TABLE 1

| Air/N₂ Scfm | Solids lb/min. | Total dp Without nozzle | Total dp With ⅜″ nozzle | Total dp With ¼″ nozzle | Gas Flow Rate SCFM |
|---|---|---|---|---|---|
| 101 | 0 | 3.6 | A | A | 0 |
| 101 | 35 | 5.4 | 3.4 | 4.8 | 6 |
| 101 | 50 | 6.1 | 4.9 | 4.7 | 6 |
| 101 | 60 | 7.5 | A | 5.7 | 6 |
| 101 | 35 | A | 5.5 | 5.8 | 0 |
| 101 | 35 | A | 4.0 | 5.1 | 2 |
| 101 | 35 | A | 3.8 | 4.6 | 4 |
| 101 | 35 | A | 3.4 | 4.8 | 6 |
| 101 | 35 | A | 3.6 | 5.3 | 8 |
| 101 | 35 | A | 4.2 | 5.5 | 10 |
| 101 | 35 | A | 4.5 | 5.5 | 12 |

A = Not determined.

The existence of both the ⅜″ and ¼″ nozzles and ingress of fluid therefrom substantially reduced the pressure drop through the riser reactor.

What we claim as our invention:

1. An apparatus for passing combined phases of an admixture of a vapor phase and fine solid particles upward through a first passageway and forcing said combined phases to a second passageway positioned at a substantially right angle with respect to said first passageway which comprises:
   (a) a first passageway comprising a vertical passageway having a diameter and being situated in a substantially vertical upright position, said first passageway having a plurality of side walls, an imperforate top, and a bottom portion, wherein said bottom portion of said first passageway includes an inlet means to permit entry into said first passageway of a combined fine solid particle-vapor phase stream;
   (b) a second passageway comprising a relatively horizontal elongated passageway situated substantially perpendicular to said first passageway and interconnecting and communicating openly at one end with a first of said side walls at an upper portion of said passageway to define a tee joint interconnection wherein a first portion of said first passageway is situated below said second passageway and a second portion of said first passageway is situated above said second passageway, and wherein said second portion terminates at said imperforate top, and wherein said second passageway communicates with, at the other end, a solid particle-vaporous phase separation means; and
   (c) a fluid inlet injection means selectively located juxtaposed or attached to a second of said side walls to inject fluid in a direction substantially perpendicular to the vertical axis of said first passageway and to project said fluid into said second passageway, wherein said select location of said fluid inlet injection means is below the uppermost interconnection of the first passageway and the second passageway and above the lowermost interconnection of the first passageway and the second passageway, and wherein said fluid injection at the selected situs acts to aid the volume of said fine solid particles transferred from said first passageway to said second passageway and acts to prevent the backflow of said fine solid particles from said upper portion of said first passageway to a portion of said first passageway located below said tee joint interconnection.

2. The apparatus of claim 1 wherein said vapor phase comprises a vapor hydrocarbon phase and said fine solid particles phase comprises an aluminosilicate catalytic composition of matter.

3. The apparatus of claim 1 wherein said first passageway is designed of sufficient length to permit a flow residence time up through said first passageway of 2 to 3 seconds.

4. The apparatus of claim 1 wherein said first passageway interconnects with said second passageway at a substantially right angle comprising an angle of 89° to 75° with respect to the first passageway.

5. The apparatus of claim 1 wherein said imperforate top is an imperforate surmounted cap as a closed extension of the diameter of said first passageway.

6. The apparatus of claim 1 wherein said fluid comprises a vapor and said fluid inlet injection means is a means selected from the group consisting of a gas injection nozzle, a bank of gas injection nozzles, contoured aperatures and perforated plates.

7. The apparatus of claim 6 wherein said fluid injection means comprises a means which injects vapor at a low velocity of 40 feet per sec to 600 ft per sec.

8. The apparatus of claim 1 wherein the fluid comprises a liquid and said fluid injection means is a means selected from the group consisting of an atomization nozzle, a fog-pattern nozzle and a spray nozzle.

9. The apparatus of claim 8 wherein said selected nozzle injects liquid in relatively small droplets having a size of 100 to 500 microns and at a pressure drop of 50 to 100 lbs/sq. in.

10. An apparatus for passing a hydrocarbon/fine particle size catalyst stream through a vertical riser reactor with a reduction in pressure drop having a horizontal tee joint discharge means which apparatus comprises:
(a) a vertical riser reactor having a diameter and means defining an upper and lower portion and further having hydrocarbon and fine particle size catalyst entry means in the lower portion of said riser reactor;
(b) a horizontal hydrocarbon and fine particle size catalyst tee joint discharge tube having a horizontal cross section interconnecting with said riser reactor at an angle of about 90° with respect to said riser reactor in open communication therewith at said upper portion of said riser reactor; and
(c) at least one fluid injection means for injecting fluid comprising a vapor across said riser reactor in a plane commensurate with said horizontal cross section of said tee joint discharge tube, wherein said fluid injection means comprises at least one high pressure fluid nozzle capable of emitting vapor in a predetermined velocity of 40 ft/sec to 600 ft/sec.

11. The apparatus of claim 10 wherein said fluid nozzles form a vapor spray pattern substantially commensurate with the cross section opening of said horizontal tee joint discharge tube at the point of communication of said discharge tube with said riser reactor.

12. The apparatus of claim 10 wherein said tee joint discharge tube and said riser reactor intersect to define said lower portion of said riser reactor below said discharge tube and said upper portion of said riser reactor above said discharge tube, wherein said upper portion of said riser reactor above said discharge tube communicates with an imperforate top of said riser reactor.

13. The apparatus of claim 12 wherein said at least one fluid injection means is located at a height substantially higher than said lower portion of said riser reactor as defined below said discharge tube interconnection and at a height substantially lower than said upper portion of said riser reactor as defined above said discharge tube interconnection.

14. The apparatus of claim 13 wherein said at least one fluid injection means is retrofitted to an existing riser reactor having said tee joint discharge tube communicating therewith.

15. An apparatus for passing a hydrocarbon/fine particle size catalyst stream through a vertical riser reactor with a reduction in pressure drop having a horizontal catalyst tee joint discharge means which apparatus comprises:
(a) a vertical riser reactor having a vertical axis and a diameter and means defining an upper and a lower portion and further having hydrocarbon and fine particle size catalyst entry means in the lower portion of the riser reactor;
(b) a horizontal hydrocarbon and fine particle size catalyst tee joint discharge tube having a horizontal cross section interconnecting with said riser reactor at an angle of about 90° with respect to said riser reactor and in open communication therewith at said upper portion of said riser reactor; and
(c) at least one liquid injection means for injecting liquid across said riser reactor in a plane commensurate with said horizontal cross section of said tee joint discharge tube and into said horizontal tee joint discharge tube wherein said liquid injection means comprises at least one injection nozzle suitable for injecting said liquid in a particle size of from 100 to 500 microns and at a pressure drop of from 50 to 100 lbs/sq. in. to cause sudden vaporization of said liquid to a vapor and to thereby create a force which aids the passage of said fine particle size catalyst into said horizontal tee joint discharge tube.

16. The apparatus of claim 15 wherein said at least one fluid injection means is retrofitted to an existing riser reactor having said tee joint discharge tube communicating therewith.

17. The apparatus of claim 15 wherein said riser reactor and said catalyst tee joint discharge tube define an acute angle with respect to said vertical axis of said riser reactor.

18. The apparatus of claim 17 wherein said acute angle is between 89° and 75° with respect to said vertical axis of said riser reactor.

19. In a method for reducing pressure drop in riser reactor having an upflow of catalyst and hydrocarbon vapors and being in open communication with a relatively horizontal tee joint connection passageway which comprises:
(a) passing said catalyst and hydrocarbon vapors up through said riser reactor having a vertical axis at a temperature of about 1000° F. to about 1500° F. and a pressure of about 1 atmosphere to 100 atmospheres to crack said hydrocarbons to smaller hydrocarbon molecules; and
(b) passing said catalyst and said hydrocarbon vapors from said riser reactor to said tee joint connection passageway having a horizontal axis at an angle substantially perpendicular to said riser reactor; the improvement which consists of injecting a fluid, through a fluid injection means, to said riser reactor in a substantially perpendicular injection flow path with respect to said vertical axis of said riser reactor and in a flow path commensurate with said horizontal axis of said tee joint connection passageway.

20. The method of claim 19 wherein said fluid comprises a vapor and said fluid injection means comprises a vapor injection means suitable to inject vapor at a relatively low velocity of 40 ft/sec to 600 ft/sec.

21. The method of claim 20 wherein said vapor injection means comprise low pressure drop nozzles having a pressure of less than 10 lbs/sq. in.

22. The method of claim 20 wherein said fluid comprises a liquid and said fluid injection means comprises a liquid injection means suitable to inject liquid in a particle drop size of from 100 to 500 microns at a pressure drop of from 50 to 100 lbs/sq. in.

* * * * *